United States Patent
Wortberg et al.

(10) Patent No.: US 9,240,704 B2
(45) Date of Patent: Jan. 19, 2016

(54) CIRCUIT FOR VOLTAGE STABILIZATION IN AN ONBOARD POWER SUPPLY

(75) Inventors: Michael Wortberg, Geisenhausen (DE); Gunter Uhl, Helmstadt-Bargen (DE); Dieter Grohmann, Gechingen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 644 days.

(21) Appl. No.: 12/809,731

(22) PCT Filed: Dec. 22, 2008

(86) PCT No.: PCT/EP2008/068156
§ 371 (c)(1),
(2), (4) Date: Sep. 29, 2010

(87) PCT Pub. No.: WO2009/080807
PCT Pub. Date: Jul. 2, 2009

(65) Prior Publication Data
US 2011/0012424 A1 Jan. 20, 2011

(30) Foreign Application Priority Data
Dec. 21, 2007 (DE) .......................... 10 2007 062 955

(51) Int. Cl.
*H02J 7/00* (2006.01)
*H02J 7/14* (2006.01)
*B60R 16/03* (2006.01)

(52) U.S. Cl.
CPC .............. *H02J 7/1423* (2013.01); *B60R 16/03* (2013.01)

(58) Field of Classification Search
CPC ........................................................ H02J 7/00
USPC ................................ 307/9.1, 10.1
See application file for complete search history.

(56) References Cited

U.S. PATENT DOCUMENTS 4,617,473 A * 10/1986 Bingham .................. 307/66
4,788,450 A * 11/1988 Wagner ..................... 307/64
(Continued)

FOREIGN PATENT DOCUMENTS

DE 19651612 A1 6/1998
DE 10128935 A1 2/2002
(Continued)

OTHER PUBLICATIONS

International Preliminary Report on Patentability and Written Opinion from PCT Application No. PCT/EP2008/068156 dated Jun. 19, 2010.
(Continued)

*Primary Examiner* — Adi Amrany
(74) *Attorney, Agent, or Firm* — Finnegan, Henderson, Farabow, Garrett & Dunner LLP

(57) ABSTRACT

A circuit (20, 50) for voltage stabilization in an onboard power supply (10), particularly for motor vehicles, which is electrically connected between the onboard power supply (10) to be stabilized and a first energy store (E1) is disclosed. The circuit (20, 50) includes a diode element (24) which contains a plurality of semiconductor switches (34) connected in parallel. The circuit (20, 50) also includes a pilot and control circuit (33). The control circuit (33) determines the level of a current flowing through the diode element (24) and controls the semiconductor switches (34) of the diode element (24) on the basis of the determined current level. The circuit (20, 50) includes a second energy store (E2) which is electrically connected to the diode element (24) and to the onboard power supply (10).

12 Claims, 4 Drawing Sheets

(56) References Cited

U.S. PATENT DOCUMENTS

| | | | | |
|---|---|---|---|---|
| 5,325,038 | A * | 6/1994 | Banzai et al. | 320/135 |
| 5,488,283 | A * | 1/1996 | Dougherty et al. | 307/10.1 |
| 5,519,557 | A * | 5/1996 | Kopera et al. | 361/84 |
| 5,525,891 | A * | 6/1996 | Meyer et al. | 320/128 |
| 5,726,505 | A * | 3/1998 | Yamada et al. | 307/127 |
| 5,764,032 | A * | 6/1998 | Moore | 320/126 |
| 5,962,928 | A | 10/1999 | Schenk | |
| 5,977,652 | A * | 11/1999 | Frey et al. | 307/10.1 |
| 6,060,943 | A * | 5/2000 | Jansen | 327/538 |
| 6,072,361 | A * | 6/2000 | Myers et al. | 330/10 |
| 6,075,345 | A * | 6/2000 | Lee | 320/138 |
| 6,229,279 | B1 * | 5/2001 | Dierker | 320/104 |
| 6,232,674 | B1 * | 5/2001 | Frey et al. | 307/10.1 |
| 6,275,001 | B1 * | 8/2001 | Dierker | 320/103 |
| 6,320,358 | B2 * | 11/2001 | Miller | 323/222 |
| 6,452,361 | B2 * | 9/2002 | Dougherty et al. | 320/104 |
| 6,507,506 | B1 * | 1/2003 | Pinas et al. | 363/79 |
| 6,545,880 | B1 * | 4/2003 | Mueller | 363/14 |
| 6,611,410 | B1 * | 8/2003 | Makaran | 361/84 |
| 6,631,065 | B2 | 10/2003 | Sugiyama et al. | |
| 6,639,384 | B2 * | 10/2003 | Hasegawa et al. | 320/126 |
| 6,800,802 | B2 * | 10/2004 | Chou | 136/244 |
| 6,879,057 | B1 * | 4/2005 | Pinas et al. | 307/10.1 |
| 6,891,425 | B1 * | 5/2005 | Huynh | 327/427 |
| 6,922,322 | B2 * | 7/2005 | Strayer et al. | 361/111 |
| 6,946,752 | B2 * | 9/2005 | Tahara | 307/134 |
| 7,336,002 | B2 * | 2/2008 | Kato et al. | 307/10.6 |
| 7,466,573 | B2 * | 12/2008 | Kojori et al. | 363/65 |
| 7,471,069 | B2 * | 12/2008 | Kusafuka et al. | 322/11 |
| 7,638,975 | B2 * | 12/2009 | Nakamiya et al. | 320/134 |
| 7,800,244 | B2 * | 9/2010 | Treguer | 307/10.1 |
| 7,924,540 | B2 * | 4/2011 | Tamegai | 361/91.5 |
| 8,344,541 | B1 * | 1/2013 | Li et al. | 307/10.1 |
| 2002/0135983 | A1 * | 9/2002 | Freitas et al. | 361/704 |
| 2002/0158513 | A1 * | 10/2002 | Amano et al. | 307/10.6 |
| 2004/0192407 | A1 * | 9/2004 | Formenti | 455/572 |
| 2006/0048983 | A1 * | 3/2006 | Urakabe et al. | 180/65.3 |
| 2006/0261368 | A1 * | 11/2006 | Fogleman | 257/107 |
| 2007/0007519 | A1 * | 1/2007 | Durbaum | 257/48 |
| 2007/0287404 | A1 * | 12/2007 | Arnborg | 455/333 |
| 2009/0103341 | A1 * | 4/2009 | Lee et al. | 363/124 |
| 2015/0076899 | A1 * | 3/2015 | Tofilescu | F02N 11/0814 307/9.1 |

FOREIGN PATENT DOCUMENTS

| | | | |
|---|---|---|---|
| DE | 10256473 | A1 | 12/2002 |
| DE | 10345310 | A1 | 4/2005 |
| DE | 102004038527 | A1 | 3/2006 |
| EP | 0810710 | B1 | 5/1997 |
| EP | 0987146 | B1 | 9/1999 |
| EP | 1520752 | A1 | 4/2005 |
| EP | 2017935 | A2 | 1/2009 |
| WO | WO 93/11003 | A | 6/1993 |
| WO | WO 2007060348 | A2 * | 5/2007 ... H02J 7/14 |

OTHER PUBLICATIONS

Written Opinion of the International Searching Authority from PCT Application No. PCT/EP2008/068156 dated Aug. 19, 2010.

* cited by examiner

CIRCUIT FOR VOLTAGE STABILIZATION IN AN ONBOARD POWER SUPPLY

FIELD OF THE INVENTION

The invention relates to a circuit for voltage stabilization in an on-board power supply (on-board electrical system), which may particularly be used in motor vehicles.

PRIOR ART

In modern motor vehicle on-board electrical systems comprising short-time, high-current consumer loads temporary problems in power supply may occur. For example in motor vehicles equipped with a start-stop function which switches off the engine to save fuel, for instance when stopping at traffic lights, the starting operation causes voltage drops. These voltage drops may lead to loss of functionality in several appliances connected to the on-board electrical system. In order to solve this problem, different approaches are known from the prior art.

Document EP 0 987 146 B1 discloses a two-battery system comprising a starter battery loaded only during the starting phase and an on-board power supply battery for power supply of the on-board electrical system. The starter battery is connected to the on-board electrical system via a controllable electronic switch such as a MOSFET only for charging and is, apart from that, disconnected therefrom so that voltage drops in the starting phase do not have any influence on the on-board electrical system.

Further, an on-board electrical system for supplying high-power consumer loads is known from document DE 103 01 528 A1. The on-board electrical system according to that invention comprises two energy storages and a controllable charging and cut-off unit. The charging and cut-off unit allows the connection of the first and/or the second energy storage with the high-power consumer load, as well as a connection of the second energy storage with the on-board electrical system. In order to ensure a trouble-free operation of the high power consumer load, the first energy storage used for starting the engine is disconnected from the high power consumer load, for example during the engine starting phase, and the latter is supplied exclusively from the second energy storage. In this manner, the high-power consumer load is isolated from voltage drops in the remaining on-board electrical system. A similar circuitry is disclosed in document DE 103 45 310 A1, wherein the disconnectable connection between the second energy storage and the high-power consumer load is achieved by two inversely arranged field effect transistors connected in series.

Further, there are technical approaches to disconnect a starter battery used for starting the engine at the instant of starting from the on-board electrical system by means of a first cut-off relay. During the period of starting the on-board electrical system is then supported by a second battery (support battery) which is connected before starting to the on-board electrical system via a second cut-off relay. In normal operating conditions of the motor vehicle, the first cut-off relay in such a circuitry is closed and the second cut-off relay is open so that the on-board electrical system is supplied through the starter battery. This energy supply is maintained also when stopping the vehicle. When the vehicle is restarted again, the second cut-off relay is at first closed to connect the support battery, and subsequently the first cut-off relay is opened so that the on-board electrical system is exclusively supplied by the support battery. If after that the engine is started by the starter battery, the voltage drop in the starter battery is separated from the on-board electrical system by means of the opened first cut-off relay. After the starting operation the first cut-off relay is closed and the second cut-off relay is opened so that the on-board electrical system is entirely supplied with energy through the starter battery and the vehicle thus passes into the normal operating state.

SUMMARY OF THE INVENTION

The invention is based upon the object to develop a reliable and fast circuit for voltage stabilization of an on-board electrical system, in particular for motor vehicles.

This object is achieved by means of a circuit for voltage stabilization of an on-board electrical system comprising the features of claim 1 and by a vehicle comprising the features of claim 12. Advantageous embodiments are defined in the dependent claims.

The object is solved by the invention in that the circuit for voltage stabilization of an on-board electrical system, particularly for motor vehicles, which is electrically connected between the on-board electrical system to be stabilized and a first energy storage, comprises the following components: a diode element which contains a single semi-conductor switch or a plurality of semi-conductor switches connected in parallel, a pilot and control circuit which determines the intensity of current flowing through the diode element and controls the semi-conductor switches of the diode element on the basis of the determined current intensity, and a second energy storage which is electrically connected to the diode element and the on-board electrical system. The expression "diode element" refers to a circuit element performing the function of a diode, that is allowing the flow of current through the element only in one direction. Advantageously, power semi-conductors may be used for the semi-conductor switches of the diode element, that is semi-conductor components designed for high currents (for example >40 A). In the circuit of the invention, the diode element takes the function of the above-mentioned first cut-off relay by ensuring that a voltage drop occurring at the first energy storage (for example during the starting operation in a motor vehicle) does not affect the on-board electrical system. In this case, no current may flow from the second energy storage or the on-board electrical system towards the first energy storage since this direction corresponds to the reverse direction of the diode element.

The first energy storage is thus unilaterally isolated from the on-board electrical system, wherein this isolation occurs automatically and without temporal delay. The diode element works autonomously and does not need any external control, for example by a further controller (body controller or energy management controller). During the voltage drop the on-board electrical system is supplied via the second energy storage so that a sufficient current supply is ensured. Due to the high current load of up to 200 A occurring for example in the on-board electrical system of a motor vehicle no conventional diode such as pn diodes or Schottky diodes can be used as diode element of the invention. In this case, a too large power loss would arise at the diode due to the diode's forward bias (forward voltage). Therefore, the diode element of the invention comprises a semi-conductor switch or a parallel connection of a plurality of semi-conductor switches.

The semi-conductor switches are controlled by the pilot and control circuit, which determines the current flowing through the diode element, in such manner that they allow a current flow from the first energy storage to the on-board electrical system, but block it in the reverse direction. By using semi-conductor switches instead of cut-off relays which being electromechanical components are subject to wear, high cycle stability and, moreover, quick response are ensured.

The circuit of the invention thus has a high durability and avoids delays, for example during the starting operation of a motor vehicle. Since the flow of current from the first energy storage into the on-board electrical system is not interrupted when using a diode element because the diode element conducts in this direction, no complicated backup energy supply for the on-board electrical system is necessary. If the circuit of the invention is used in the on-board electrical system of a motor vehicle, in which a starter for starting the engine and a generator operated through the engine are provided, the following additional advantage results. In the present circuit, as an accidental cut-off of the electrical connection from the first energy storage to the on-board electrical system is impossible (as instead may happen in the case of the above-mentioned first cut-off relay during a software or hardware error in the controller), the generator required for the power supply of the on-board electrical system may be arranged to be electrically connected in front of the diode element (i.e. so that the diode element is disposed between the generator and the on-board electrical system) and close to the first energy storage. Such a construction is particularly advantageous in conjunction with an integrated starter/generator element in which the above-described circuit comprising two cut-off relays would be impossible, since in that case the on-board electrical system would no longer be supplied with power through the generator if the cut-off relay opens erroneously. Further, in the circuit of the invention high compensating currents from the second energy storage to the first energy storage, for example during the starting operation of a motor vehicle, are avoided because the diode element does not conduct in this direction. Consequently, undesired discharging of the second energy storage and possible damage to the circuit are avoided.

The diode element comprises a discretely structured pilot and control circuit. This circuit can recognize the direction of current via the diode element. The control circuit switches the semi-conductor switches into a conducting state for current flow in the forward direction. If the voltage of the second energy storage (for example a support battery) at the instant of switching is higher than the one of the first energy storage (for example a starter battery), the diode function of the pilot and control circuit serves to avoid a reversal of the direction of current. The zero point of the current during current reversal is recognized by the pilot and control circuit, and the semi-conductor switches are blocked by the pilot and control circuit so that no current can flow in the reverse direction.

In an alternative embodiment the diode element further comprises a diode connected in parallel to the semi-conductor switches, in particular a Schottky diode. In this case, small currents (for example I<10 A in the case of a motor vehicle on-board electrical system) may flow from the first energy storage via the diode to the on-board electrical system, even if the semi-conductor switches are opened. The level of current flowing through the diode may be determined through the pilot and control circuit, and if it exceeds a predetermined first threshold, the semi-conductor switches may be closed by the pilot and control circuit. The current above the first threshold then flows through the diode and the semi-conductor switches connected in parallel so that a high power loss at the diode is avoided. If the current falls below a predetermined second threshold which may be different from the first threshold this is recognized by the pilot and control circuit, and the semi-conductor switches are opened correspondingly. The current below the threshold then flows entirely through the diode.

Preferably, the second energy storage is a battery that is connected via a switching unit. If a voltage drop occurs at the first energy storage, for example during the starting operation of a motor vehicle, the battery may then be connected via the switching unit to the on-board electrical system to supply it with power. In the case of starting the engine of a motor vehicle, the "clamp 50" signal of the ignition lock may be used as control signal for the switching unit.

In a preferred embodiment, this switching unit comprises two inversely disposed semi-conductor switches connected in series (in particular power semi-conductor switches), preferably field effect transistors. The connection of the battery may thus be effected in a quick and straightforward manner by closing the semi-conductor switches. To that end, field effect transistors are especially suitable, in particular metal oxide semi-conductor field effect transistors (MOSFETs) which are switchable by low gate voltages with minimum delay. An inversely arranged serial connection of the semi-conductor switches as used herein refers to an arrangement in which the conducting directions of the intrinsic diodes of both semi-conductor switches are opposite to each other so that no flow of current from the battery to the on-board electrical system or in the direction opposite thereto is possible when the switches are opened. In field effect transistors, this corresponds to a polarity in which the source of the first transistor is opposite to the source of the second transistor or in which the drain of the first transistor is opposite the drain of the second transistor.

Preferably, the circuit for voltage stabilization further comprises a micro-controller for controlling the semi-conductor switches of the switching unit. In this case, the connection of the battery can be controlled by having the micro-controller determine the voltage and the temporal voltage drop via the semi-conductor switches of the switching unit, compare them with predetermined values and possibly close the semi-conductor switches. Thus, no external control is necessary, such as the "clamp 50" signal when starting the engine of a motor vehicle. If the voltage lies below 12 V common in the electrical system of a motor vehicle, for example, and a voltage drop having a voltage change of 1 V/ms occurs, the battery is connected and supports the on-board electrical system. This autonomous connection of the battery would not be possible with a relay because the latter has a too long switching time and, thus, the voltage would drop too much before a supporting action of the on-board electrical system via the battery is effected. Since the diode element also operates autonomously, the stabilization operation of the on-board electrical system may be performed without additional external control, thus making possible a simple construction of the circuit and shorter response times. Preferably, the microcontroller further comprises a device or function for monitoring the temperature of the semi-conductor switches of the diode element. Thus, in the case of excess temperature an error message may be output and the energy supply may be controlled correspondingly. In a motor vehicle on-board electrical system, for example, in the case of imminent failure of the semi-conductor switches of the diode element, the energy supply could be shifted to a "limp home" operation (i.e. an emergency operation) in which only those elements are supplied with power, which are absolutely necessary for the operation of the motor vehicle.

Preferably, the circuit further comprises a device for testing the charging condition of the battery, for example by measuring the impedance of the battery. If the charging condition reaches a predetermined critical point, the battery may be recharged again from the first energy storage or, in the case of a motor vehicle, by the generator.

Instead of a battery, in a further embodiment a super capacitor (super cap) may be used as second energy storage, too. Super capacitors are double layered capacitors which can be used as energy storage with a high storage density and which may have capacitance values of several Farads up to several thousand Farads. Super capacitors can store and release energy in a very short time and can thus react very quickly to voltage oscillations in the on-board electrical system. As the super capacitor discharges by itself if the voltage in the on-board electrical system falls below the voltage applied across the capacitor, no switching units for connecting the super capacitor with the on-board electrical system is necessary. It is only necessary to design the capacitor so that when the capacitor is fully charged the voltage generated corresponds approximately to the operating voltage of the on-board electrical system. In idle or normal operating phases in which the power supply of the on-board electrical system is performed by the first energy storage, the super capacitor can be recharged by the first energy storage, or by the generator in the case of a motor vehicle.

Preferably, the semi-conductor switches of the diode element are field effect transistors, in particular metal oxide semi-conductor field effect transistors (MOSFETs), for example power MOSFETs. As field effect transistors may be switched with low gate voltages and minimum time delay, it is possible to react quickly to changes in the flow of current through the diode element. The field effect transistors connected in parallel may be arranged so that the conduction direction of their intrinsic diodes corresponds to the direction from the first energy storage to the on-board electrical system. Thus, it can be ensured that if the transistors are blocked, no flow of current from the second energy storage to the first energy storage may occur. On the other hand, even with blocked transistors, a portion of the current flowing from the first energy storage to the on-board electrical system may be carried by the intrinsic diodes of the field effect transistors. If the flow of current through the intrinsic diodes increases above a predetermined threshold so that the power losses across the diodes become too large and there is hence the danger of destroying the field effect transistors, the transistors are switched into a conducting state by the pilot and control element. If the voltage at the first energy source drops during the starting operation of a motor vehicle, for example, then the flow current from the connected second energy source to the first energy source is prevented by blocking the transistors.

In a further embodiment the circuit for voltage stabilization of the on-board electrical system is electrically connected between the on-board electrical system to be stabilized and one or more high-current consumer loads connected to a first energy storage. Thus, the first energy storage can simultaneously or sequentially supply energy to several high-current consumer loads, for example, so that their function is ensured, with voltage drops in the on-board electrical system being prevented by the circuit of the invention.

Preferably, one of the high-current consumer loads is a start-stop function or an EPS system (electromechanic power-assisted steering; power steering) or an electro-hydraulic brake. The first energy storage may also be used for the supply of power to a combination (or all) of the above components. While the mode of operation and the advantages of the invention were hitherto described largely for the exemplary case of a start-stop function of the motor vehicle as high-current consumer load, it is not limited to such a use but may be employed also for any other type of switching system, in particular those comprising a high-current consumer loads.

Further, the invention concerns a motor vehicle, in particular an automobile, comprising a circuit for voltage stabilization of an on-board electrical system of the invention. Motor vehicle switching systems generally comprise a series of high-current consumer loads, such as a starter, an electro-hydraulic brake, a power steering (EPS) etc. As the on-board electrical system of the motor vehicle supplies power to pilot and control devices that are indispensable for a safe operation of the vehicle, a secure power supply of the on-board electrical system must be ensured at any time, independently of possible voltage drops at the high-current consumer loads. This object is achieved by the invention, wherein no external control, for example through a further controller (body controller or energy management controller), is necessary, enabling a simple construction and operation of the motor vehicle switching system. For example, for incorporating it into an automobile as an electronic module, the circuit of the invention may be integrated into the main distributor. This distributor (distribution box) comprises a lead frame for distributing the generator or battery current as well as fusible cutouts for protecting the leads. If the semi-conductor switches of the diode element are configured as MOSFETs having an intrinsic diode conduction direction from the first energy storage to the on-board electrical system, then protection of the transistors against a short circuit by switching off is not possible in this current direction. Consequently, it is only possible to protect this lead through a fusible cutout of the main distributor. Then, the structure of the MOSFETs must be so as to be able to support the short circuit current of the largest subsequent fusible cutout.

BRIEF DESCRIPTION OF THE DRAWINGS

In the following, the invention is described by way of example with the help of the accompanying drawings, wherein.

DETAILED DESCRIPTION OF THE EMBODIMENTS

Figure 1:
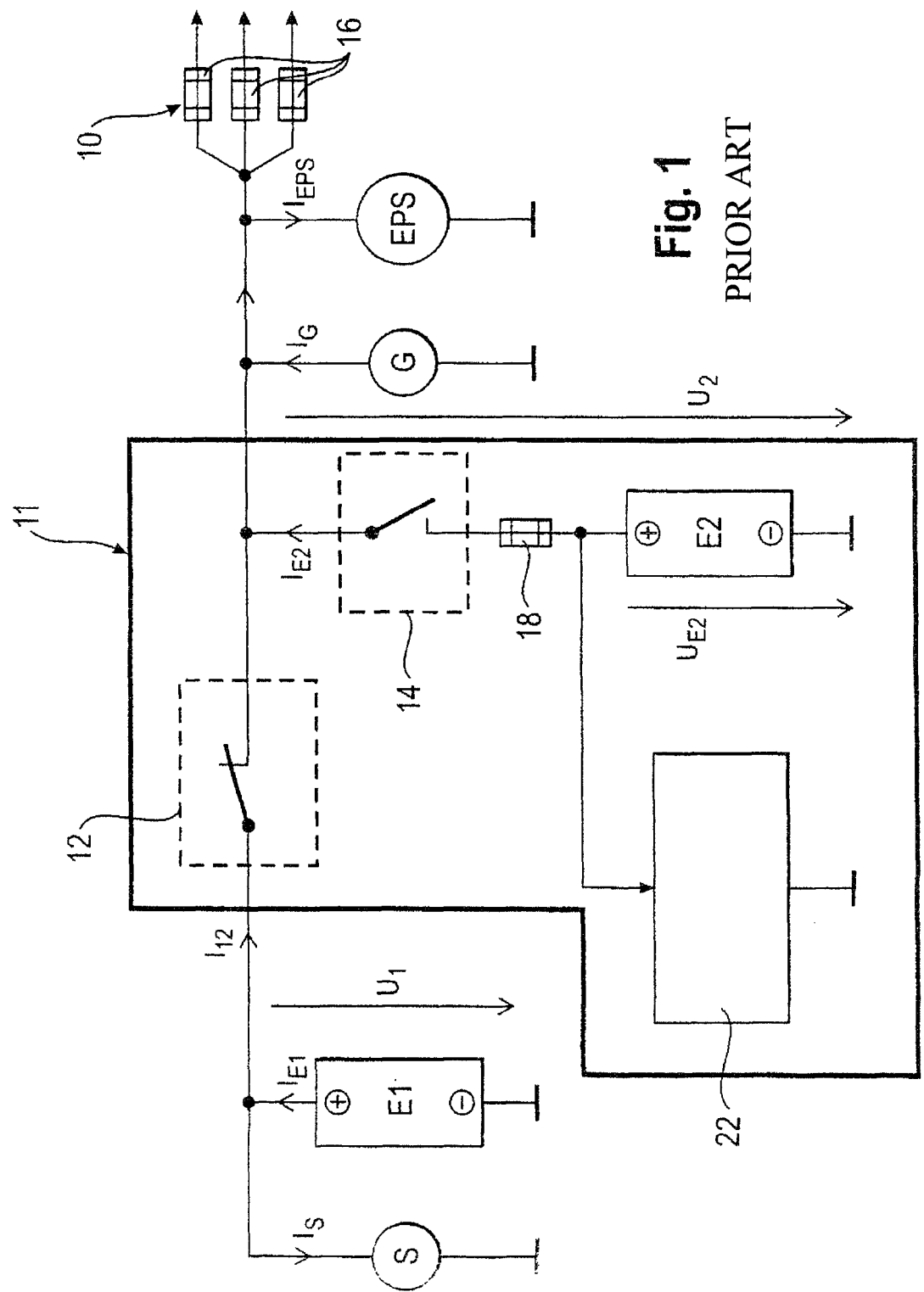
FIG. 1 shows a circuit diagram of a circuit for voltage stabilization of an on-board electrical system according to the state of the art.

FIG. 1 shows a circuit diagram of a circuit 11 for voltage stabilization of an on-board electrical system 10 of a motor vehicle known from the state of the art, which serves for the supply of power to current consumer loads 16 such as pilot and control devices. The circuit 11 is electrically connected between the on-board electrical system 10 to be stabilized and a starter S connected to the first energy source E1 (in this case a battery). Starter S serves for starting a combustion engine in a motor vehicle. Further, an EPS system (EPS; power steering) and a generator G for current generation and driven by the combustion engine are connected between the circuit 11 and the on-board electrical system 10. The circuit 11 comprises a first cut-off relay 12, a second cut-off relay 14, a cutout 18 and a second energy storage E2 (in this case a battery) connected to the on-board electrical system 10 through the cut-off relay 14 and the cutout 18. The charging state of battery E2 is tested by an impedance measurement device 22, for example.

Figure 2:
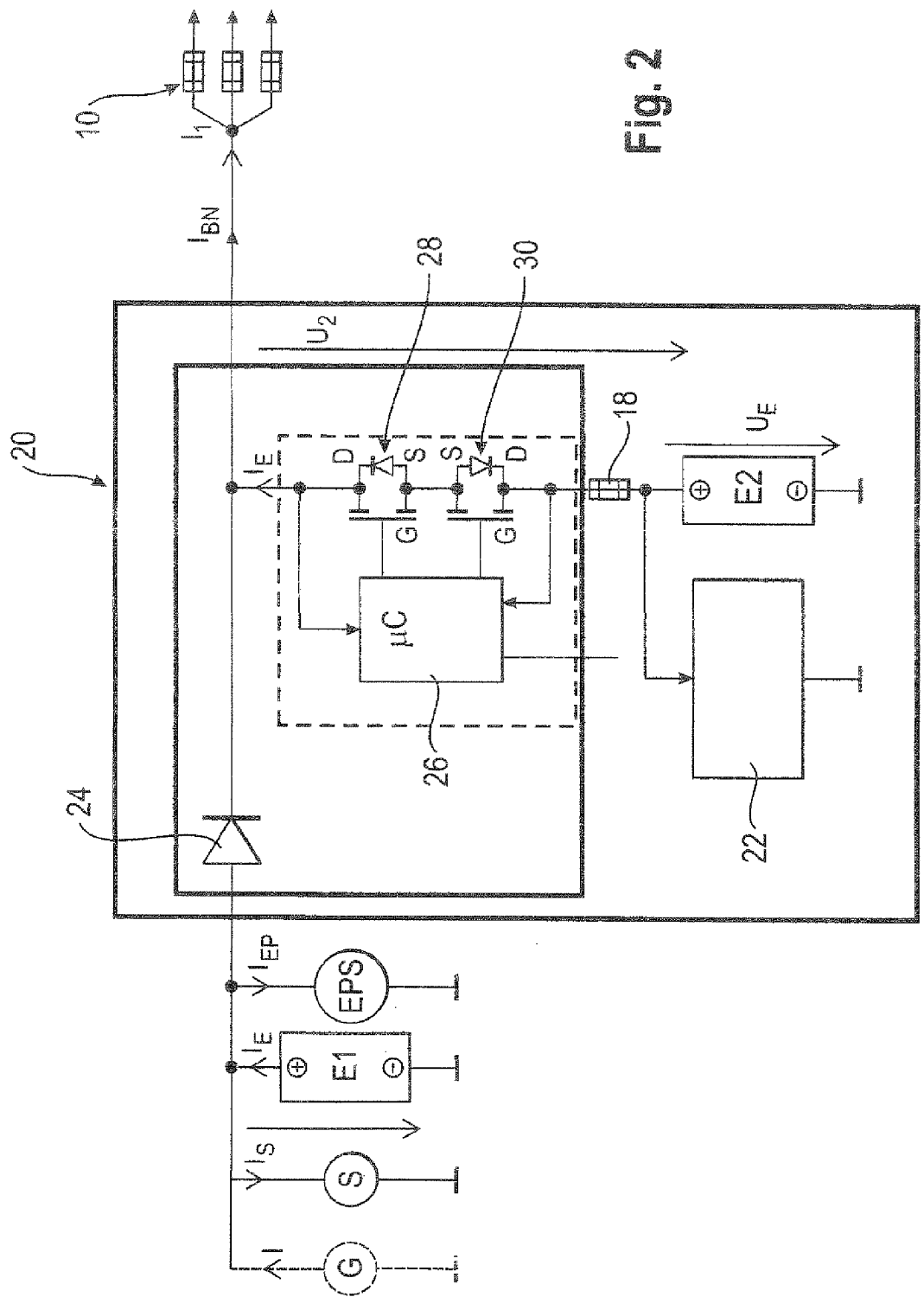
FIG. 2 shows a circuit diagram of a circuit for voltage stabilization of an on-board electrical system according to a first embodiment of the invention.

FIG. 2 shows a circuit 20 for voltage stabilization of an on-board electrical system 10 according to a first embodiment of the invention, which is electrically connected between two high-current consumer loads (starter S and EPS system of a motor vehicle) connected with a first energy storage E1 (in this embodiment a battery) and the electrical system 10 to be stabilized. The circuit 20 comprises a diode element 24, a micro-controller 26, two inversely arranged power MOSFETs 28, connected in series, a cutout 18 and a second energy storage E2 (in this embodiment a battery) connected to the on-board electrical system 10 through the cutout 18 and the two power MOSFETs 28, 30. The charging state of the second battery E2 is monitored by an impedance measurement device 22. The micro-controller 26 has the purpose to control the voltages applied at the gate G of the power MOSFETs 28, 30 and, thus, to switch the MOSFETs 28, 30 as desired. Further, the micro-controller 26 measures the voltage and the temporal behavior of the voltage across the two MOSFETs 28, 30.

Figure 3:
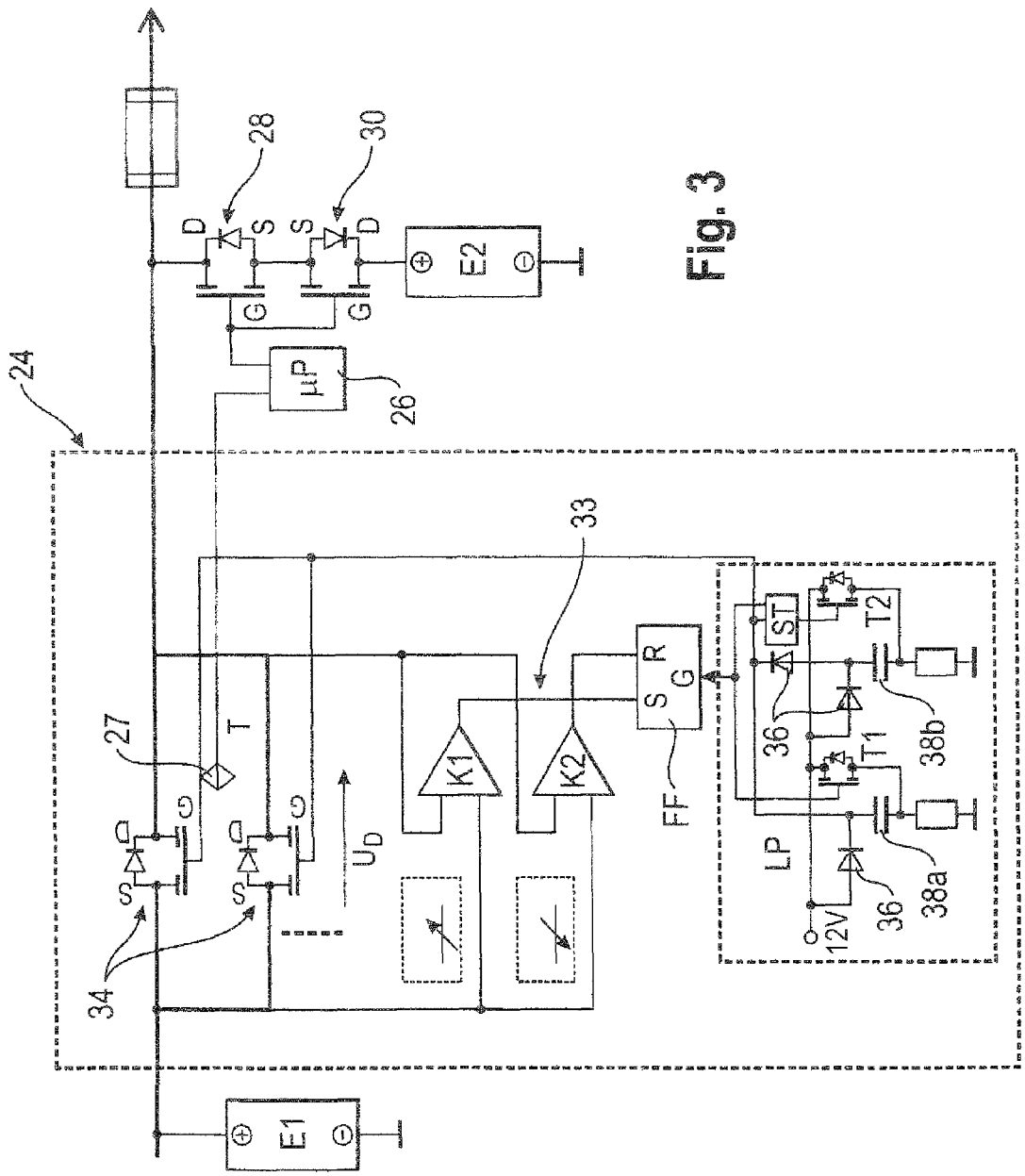
FIG. 3 shows a circuit diagram of the diode element of the circuit for voltage stabilization of an on-board electrical system of the first embodiment of the invention shown in FIG. 2.

FIG. 3 shows a circuit diagram of the diode element 24 according to the first embodiment of the invention shown in FIG. 2. The diode element 24 comprises six power MOSFETs 34 connected in parallel to the diode, only two of which are shown in FIG. 3, though. MOSFETs 34 comprise a switch-on resistance of a few mOhm and are so designed that a current of 200 A may flow without problems across the parallel connection of the six MOSFETs 34. In this case, each of the MOSFETs 34 would bear a current of 33 A so that both the voltage drop (33 mV) and the power loss (1.1 W) across the transistors 34 would not be critical. Further, FIG. 3 shows a pilot and control circuit 33 comprising two comparators K1 and K2, a flip-flop element FF and a charge pump LP. The charge pump LP comprises a Schmitt trigger ST, two capacitors 38a and b, three diodes 36 and two MOSFETs T1, T2. Further, the micro-controller 26 is provided with a device 27 for measuring the temperature of the power MOSFETs 34. To protect against the case that the circuit comprising comparators K1, K2 and flip-flop element FF fails, it may be duplicated, for example with two banks of semi-conductor switches connected in parallel (in the present case for example two banks of three MOSFETs each).

Figure 4:
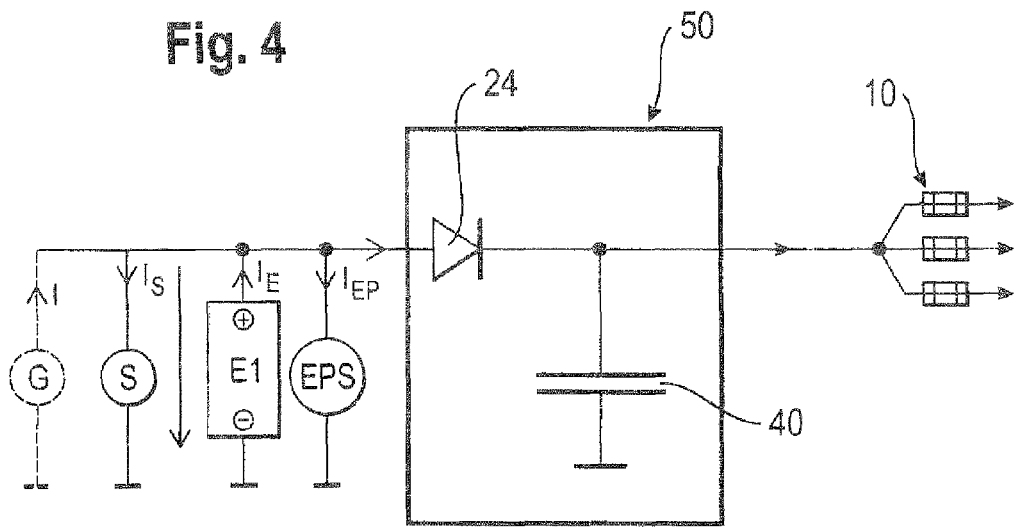
FIG. 4 shows a circuit diagram of a circuit for voltage stabilization of an on-board electrical system according to a second embodiment of the invention.

FIG. 4 shows a circuit diagram of a circuit 50 for voltage stabilization of an on-board electrical system 10 according to a second embodiment of the invention. The circuit 50 comprises a diode element 24 constructed as shown in FIG. 3 and a super capacitor 40 (super cap) having a capacity of 110 F.

As explained above, in the circuit 20, 50 of the invention an arrangement of current generator G in front of the diode element 24 (left of the diode element 24 in FIGS. 2 and 4) is possible since an accidental interruption of current flow from the generator G to the on-board electrical system 10 through the diode element 24 is not possible (contrary to the circuit 11 having the cut-off relay 12 shown in FIG. 1). Therefore, the present circuit 20, 50 may also be used in motor vehicles in which the starter S and the generator G are designed as an integrated unit.

In the following, the mode of operation of the circuit known from the prior art and of the circuit of the invention are explained with the help of FIGS. 1 to 4.

In the circuit 11 known from the prior art and shown in FIG. 1, the cut-off relay 12 is closed in the normal operating state of the motor vehicle and the cut-off relay 14 is opened. Therefore, the on-board electrical system 10 is supplied with power through the first battery E1 and the generator G. This power supply is maintained if the motor vehicle is in the stopped state. Upon starting, the second cut-off relay 14 is closed and afterwards the first cut-off relay 12 is opened so that the on-board electrical system 10 is supplied with power via the second battery E2. Now if the engine is started via starter S by the first battery E1, the voltage drop in battery E1 is separated from the on-board electrical system 10 by the open first cut-off relay 12. After starting the engine, the first cut-off relay 12 is closed again and the second cut-off relay 14 is opened. In such a circuit design the problems already described above may occur. The circuit 20 of the first embodiment of the invention solves these problems in the following manner.

If the motor vehicle is in the idle state, the low on-board current (<~5 A) flows across the intrinsic diodes of the power MOSFETs 34 (see FIG. 3). If the current increases above a predetermined threshold (approximately 5 A), the comparator K1 of the pilot and control circuit 33 switches to "1" because the threshold voltage $U_D$ applied across the intrinsic diodes 34 is exceeded. The subsequent flip-flop FF having a short gate delay is set to "1". The flip-flop FF set to "1" activates the charge pump LP. Since the power MOSFETs 34 have to be switched very fast when the current rises in order to avoid damage or destruction of the intrinsic diodes of the MOSFETs, an extremely short reaction time of the charge pump LP is necessary. This may be achieved for example by raising a charged capacitor 38a via a transistor T1 to the operating voltage of the on-board electrical system 10 in order to switch the gates G of the power MOSFETs 34. In parallel, continuous charge pumping can be effected via a Schmitt trigger ST and a second capacitor 38b switched via the transistor T2, in order to oppose a voltage drop on the gate lead due to leakage currents. The voltage across the intrinsic diodes drops below the threshold voltage of the comparator K1, so that the comparator output returns zero. However, the gate G of the power MOSFETs 34 remains switched because the flip-flop FF maintains its state "1". Blocking the power semi-conductors upon current reversal is effected through the comparator K2. It recognizes the zero point of the voltage across the power semi-conductors if the current across the power semi-conductors has its zero crossing. At a voltage of 0 V the output of the comparator K2 returns to "1" and resets the flip-flop. With this transition of the output of the flip-flop the transistors T1 and T2 are switched off. The voltage applied to gate G of the power MOSFETs 34 via capacitors 38a and 38b thus returns to zero and the power MOSFETs 34 are blocked. Therefore, apart from the comparator K2 no circuit element takes up any more idle current. Since the power MOSFETs 34 are blocked and the conduction direction of the intrinsic diodes of the power MOSFETs 34 corresponds to the current direction from the first battery E1 to the second battery E2, a reversal of the current, that is a flow of current from the second battery E2 to the first battery E1 is prevented. The diode element 24 thus acts as a diode, but without the losses across the forward bias as in a conventional pn- or Schottky-diode.

The connection of the second battery E2 to the on-board electrical system may be effected automatically upon starting the engine via the "clamp 50" signal. Further, there is also the possibility to determine the voltage and the temporal voltage drop across the power MOSFETs 28, 30 by the micro-controller 26 (see FIG. 2). If the voltage drops below the normal operating voltage of the on-board electrical system and the temporal voltage drop exceeds a predetermined value, such as 1 V/ms, the power MOSFETs 28, 30 may be switched automatically via the micro-controller 26 so that the on-board electrical system 10 is supplied with power via the second battery E2.

If a super capacitor 40 is used instead of a second battery E2, no further switching units for connecting the second energy storage is necessary. In this second embodiment of the invention shown in FIG. 4 the diode element 24 features the above-described mode of operation and the structure shown in FIG. 3. The super capacitor 40 is fully charged and has a voltage corresponding to the operating voltage of the on-board electrical system 10. If the voltage of the on-board electrical system 10 falls below this value, a potential difference between the on-board electrical system 10 and the super capacitor 40 is generated, and the super capacitor thus discharges automatically. Thereby, the on-board electrical system 10 is supplied with power by the super capacitor 40 and, thus, a voltage drop at the first battery E1 is compensated. If the phase of the voltage drop (for instance the starting phase of the engine) is terminated, the super capacitor 40 may again be fully recharged via the generator G and the first battery E1.

Figure 5:
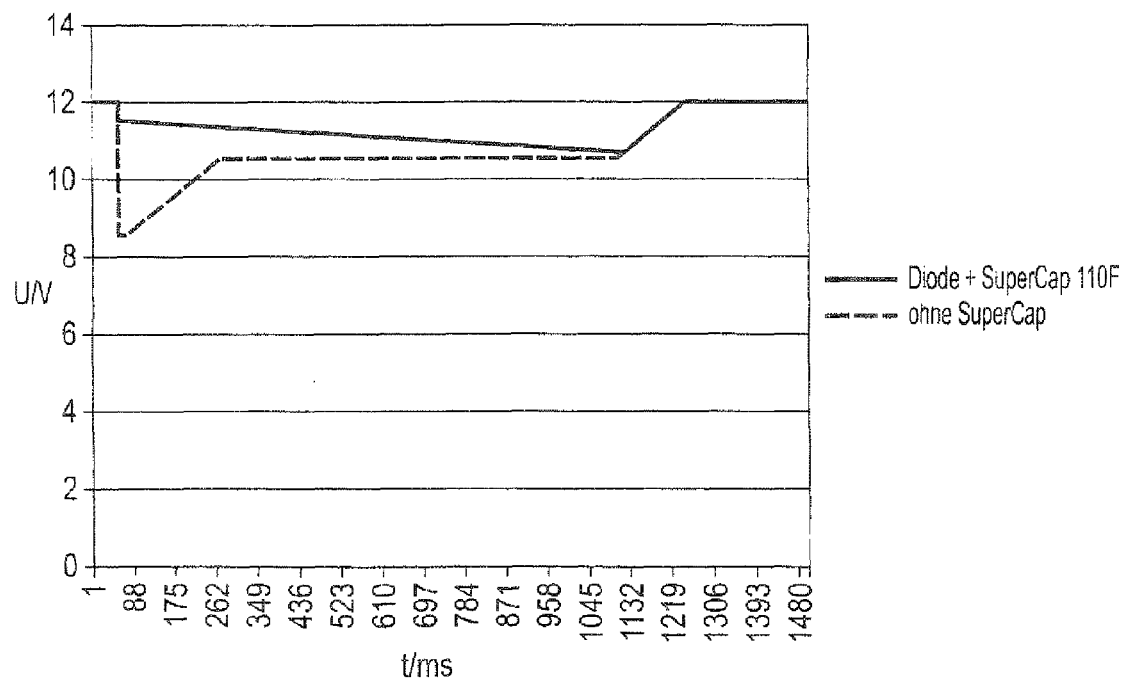
FIG. 5 shows the temporal voltage behavior in an on-board electrical system without voltage stabilization and with voltage stabilization by the circuit of the second embodiment of the invention shown in FIG. 4.

The smoothing of the voltage drop in the on-board electrical system 10 upon starting a motor vehicle by means of a circuit 50 of the second embodiment of the invention is now shown in FIG. 5. As soon as the voltage in the on-board electrical system 10 drops due to the starting operation, the on-board electrical system is supplied with power by the super capacitor 40. Thus, the voltage drop may be absorbed and a smoother voltage profile may be achieved as compared to an on-board electrical system 10 without the circuit 50 of the second embodiment of the invention. Therefore, a sufficient supply of power to all components of the on-board electrical system 10 is ensured at all times.

The invention claimed is:

1. A circuit for voltage stabilization of an on-board motor vehicle electrical system, the circuit comprising:
a diode element comprising a plurality of first semi-conductor switches connected in parallel, wherein the diode element is configured and arranged to allow current flow only in a direction from an energy storage towards the on-board motor vehicle electrical system;
a pilot and control circuit configured to determine an intensity of a current flowing through the diode element and to control said plurality of first semi-conductor switches of the diode element based on the determined current intensity in such manner that said plurality of first semi-conductor switches allow a current flow from the energy storage to the on-board motor vehicle electrical system, but block a current flow from the on-board motor vehicle electrical system to the energy storage;
a battery electrically connected to the diode element and connectable to the on-board motor vehicle electrical system; and
a switching unit connecting the battery to the on-board motor vehicle electrical system, the switching unit including:
two inversely arranged second semi-conductor switches connected in series; and
a micro-controller for controlling the second semi-conductor switches, the micro-controller being configured to:
determine a voltage and a temporal voltage drop across the second semi-conductor switches, and
turn on the second semi-conductor switches such that the battery supplies power to the on-board electrical system if:
the voltage across the second semi-conductor switches is smaller than a normal operating voltage of the on-board electrical system, and
the temporal voltage drop across the second semi-conductor switches exceeds a predetermined rate,
wherein the circuit is electrically connected between the on-board motor vehicle electrical system and the energy storage and wherein the circuit is electrically connected between the onboard motor vehicle electrical system and a starter, the circuit being adapted to stabilize the onboard motor vehicle electrical system.

2. The circuit according to claim 1, wherein the diode element comprises a diode connected in parallel to said plurality of first semi-conductor switches.

3. The circuit according to claim 2, wherein the diode is a Schottky diode.

4. The circuit according to claim 1, wherein the micro-controller is further configured to monitor the temperature of the first semi-conductor switches of the diode element.

5. The circuit according to claim 1, further comprising:
a device configured to test the charge condition of the battery.

6. The circuit according to claim 5, wherein the device is adapted to measure an impedance of the battery.

7. The circuit according to claim 1, wherein the first semi-conductor switches of the diode element are field effect transistors.

8. The circuit according to claim 1, wherein the circuit is electrically connectable between the motor vehicle on-board electrical system to be stabilized and one or a plurality of high-current consumer loads connectable to the energy storage.

9. The circuit according to claim 8, wherein one of the high-current consumer loads is one of a start-stop function, electronic power steering system, and an electro-hydraulic brake.

10. The circuit according to claim 1, in combination with a motor vehicle.

11. The circuit according to claim 1, wherein each of the two second semi-conductor switches comprises a field effect transistor.

12. The circuit according to claim 1, wherein the pilot and control circuit is configured to stabilize an operating voltage of the on-board motor vehicle electrical system by controlling the plurality of first-semiconductor switches.

* * * * *